United States Patent [19]

Hirano

[11] 4,360,070

[45] Nov. 23, 1982

[54] COMBINATION WEIGHING DEVICE SELECTING DESIRED WEIGHT AND NUMBER OF ARTICLES

[75] Inventor: Takashi Hirano, Kobe, Japan

[73] Assignee: Yamato Scale Company, Ltd., Hyogo, Japan

[21] Appl. No.: 217,434

[22] Filed: Dec. 17, 1980

[30] Foreign Application Priority Data

Dec. 24, 1979 [JP] Japan .............................. 54-168818

[51] Int. Cl.³ ...................... G01G 19/04; G01G 13/00
[52] U.S. Cl. ........................................ 177/25; 177/103
[58] Field of Search ...................... 177/1, 25, 145, 103; 209/592-596

[56] References Cited

U.S. PATENT DOCUMENTS

| | | | |
|---|---|---|---|
| 2,802,658 | 8/1957 | Hensgen et al. ........................ | 177/1 |
| 3,708,025 | 1/1973 | Soler et al. ............................. | 177/1 |
| 3,939,928 | 2/1976 | Murakami et al. ................... | 177/1 X |

Primary Examiner—George H. Miller, Jr.
Attorney, Agent, or Firm—Eugene E. Geoffrey, Jr.

[57] ABSTRACT

A combination weighing device, which is typically used for packing a plurality of solid articles in each bag or the like, including a plurality of weighing balances for weighing a plurality of articles each at the same time, and arithmetic means for selecting some of these weighing balances so that the total weight of the articles thereon falls within a predetermined allowable range, the device also including means for checking the number of these selected articles to make them fall within a predetermined allowable range, and collecting these articles in a pack or bag so that each pack is substantially constant in weight and contains a substantially constant number of articles.

2 Claims, 1 Drawing Figure

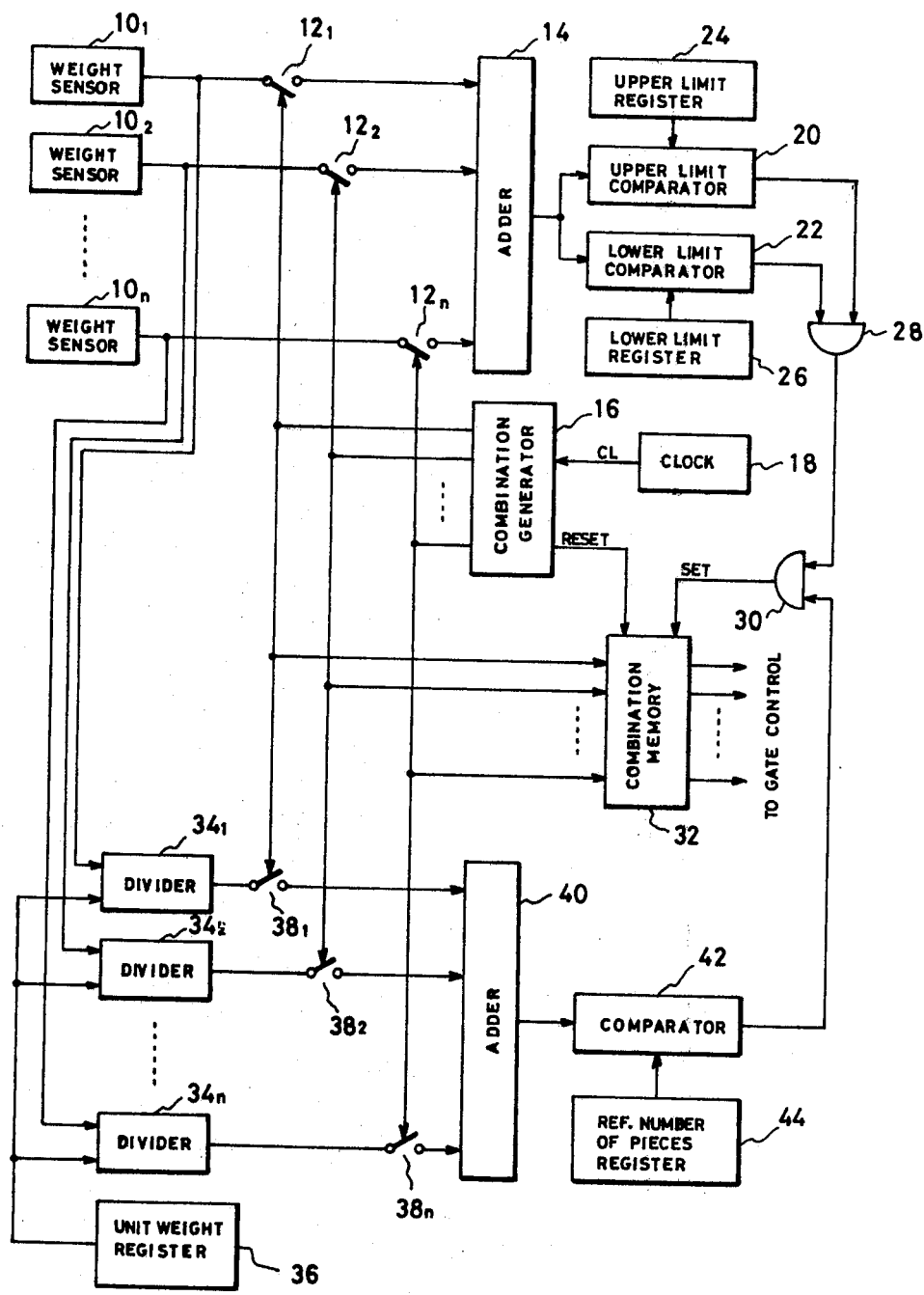

COMBINATION WEIGHING DEVICE SELECTING DESIRED WEIGHT AND NUMBER OF ARTICLES

This invention relates to an improved combination weighing device, particularly to a device for use in a case wherein a plurality of articles are to be packed together so that each pack is nearly constant in weight and contains substantially the same number of articles.

The weighing device which is generally referred to as a "combination weighing device" or "combination balance" is used for extracting and collecting a plurality of articles from a group of articles, such as cakes, fish and vegetables, having relatively large variances in respective weights, so that the extracted group has a total weight which is nearly equal to a predetermined intended weight which will be hereinafter referred to as "reference weight." A typical example of such a device is disclosed in U.S. Pat. No. 3,939,928, and another example which is improved over that United States patent in arithmetic arrangement is described in the pending United States patent application Ser. No. 102,660 filed Dec. 12, 1979. In these devices, a plurality of articles are weighed individually by a plurality of weighing balances at the same time. All mathematical combinations of the respective measured weights are summed up respectively and the summed weights are compared with predetermined allowable upper and lower limits. When the sum falls between both limits, the articles on the weighing balances forming the combination at that time are collected in a pack, thereby providing each successive pack with a plurality of articles of substantially constant total weight.

In such prior art combination weighing devices, however, there is a possibility of the occurrence of differences in the number of articles between the respective packs, especially when there is a substantial variation in the weights of individual articles. In the purchase of merchandise, the customer may tend to select a pack taking the number of articles contained therein into consideration, even if the weight of each pack is the same. Therefore, it is sometimes more important to control the number of articles in each pack, rather than its weight, to be always constant. Consequently, it is often desirable to pack articles so that each pack contains not only constant weight but also a constant number of articles.

Accordingly, an object of this invention is to provide an improved combination weighing device which can select a combination of weighing balances during each cycle of operation so that the total weight and total number of articles on these balances fall within predetermined ranges, respectively.

According to this invention, a combination weighing device comprises a plurality of weighing balances for weighing a plurality of articles each to produce weight signals, respectively, means for coupling the outputs of the weighing balances through normally-open switches respectively to summing means for summing up the weight signals to produce a sum output, a comparator for comparing the sum output with a predetermined range to produce a first comparison output when the sum falls within that range, combination control means for generating a predetermined set of combinations of outputs successively to close the normally-open switches in accordance with these combinations, and a combination memory for temporarily storing these combinations successively. According to a feature of this invention, the device further comprises means for detecting the total number of articles corresponding to each combination, another comparator for comparing the total number of articles with a predetermined range to produce a second comparison output when the total number falls within that range, and means for responding to the simultaneous appearance of both the first and second comparison outputs to cause the combination memory to store the current inputs for utilization.

These and other objects and features of this invention will be described in more detail hereinunder with reference to the accompanying drawing.

The single drawing is a block diagram representing an embodiment of the combination weighing device according to this invention.

Referring to the drawing, the combination weighing device includes a plurality of weight sensors $10_1$, $10_2$, . . . $10_n$, such as load cells, for sensing the weights of articles carried on a plurality of corresponding weighing balances (not shown), respectively, to produce weight signals indicative of the respective weights. These weight signals are coupled respectively through normally-open switches $12_1$, $12_2$, . . . $12_n$, each having a control input, to an adder circuit 14 which sums up the weight signals supplied thereto to produce a sum output. The control terminal of each normally-open switch 12 is coupled to a corresponding one of n-number of output terminals of a combination generator 16. The combination generator 16 is driven by clock pulses CL from a clock pulse generator 18 to produce a predetermined set of combinations of output signals from its selected output terminals in clocked fashion. For example, if the predetermined set of combinations are complete mathematical combinations of the n-number of outputs, the combination generator 16 may be an n-bit binary counter having a control input coupled to the clock pulse generator 18 and n-number of parallel outputs coupled respectively to the output terminals. In this case, the logic "high" level or binary "1" serves as the "output signal" from each output terminal of the combination generator 16. As widely known by those skilled in the art, the total number of such combinations is $2^n - 1$ and the combination generator 16 produces $(2^n - 1)$ sets of output signals successively in synchronism with the applied clock pulses CL.

The sum output of the adder circuit 14 is applied to an upper limit comparator 20 and to a lower limit comparator 22. The upper and lower limit comparators have second inputs coupled to the outputs of the upper and lower limit registers 24 and 26, respectively. The upper and lower limit registers 24 and 26, each having an input device such as conventional digital keyboard (not shown), store predetermined upper and lower limits of allowable range of the weight of combined articles, respectively. The comparators 20 and 22 compare the sum output with these upper and lower limits and produce outputs at the same time when the sum is within the prescribed range. These outputs are coupled to both inputs of an AND gate 28 to turn it on, and the output of gate 28 is coupled to one input of another AND gate 30. The output of the AND gate 30 is coupled to a set input of a combination memory 32.

The combination memory 32 has a plurality (n-number) of input terminals coupled respectively to the corresponding output terminals of the combination generator 16, and same number of corresponding output terminals coupled respectively to gating arrangements (not shown) associated with the corresponding weighing balances (not shown). The combination memory 32 serves to store a set of incoming signals in response to the set input from the AND gate 30 and discharge them from the corresponding output terminals in response to a reset signal applied from the combination generator 16 at the end of each combination cycle, thereby controlling unloading means of the corresponding weighing balances. The combination memory can be designed easily by those skilled in the art and will not be described further.

As a feature of this invention, the combination weighing device further includes a plurality of dividers $34_1$, $34_2$, ... $34_n$ each having one input coupled respectively to an output each of the weight sensors $10_1$, $10_2$, ... $10_n$. The second inputs of the dividers are coupled in common to the output of a unit weight register 36 having an input device such as conventional digital keyboard to store a predetermined unit weight of the articles. Each divider 34 has the function of dividing the weight signal from the corresponding weight sensor by the content of the unit weight register 36 and rounding the result into an integer, thereby obtaining the number of articles on the corresponding weighing balance. The outputs of the dividers $34_1$, $34_2$, ... $34_n$ are coupled respectively through normally-open switches $38_1$, $38_2$, ... $38_n$ to an adder circuit 30 which sums up the outputs of the dividers applied thereto to produce an output indicative of the number of pieces of the articles. The normally-open switches $38_1$, $38_2$, ... $38_n$ also have their control inputs coupled respectively to the corresponding outputs of the combination generator 16, so that they are switched in synchronism with and in the same fashion as the normally-open switches $12_1$, $12_2$, ... $12_n$, respectively. Accordingly, the adder circuit 40 produces the total number of articles on the weighing balances selected by the combination generator 16, while, at the same time, the adder circuit 14 produces the total weight of the same articles. The output of the adder circuit 40 is supplied to a comparator 42 which compares the obtained total number with the content of a register 44. The register 44 is similar in structure to the other registers and stores the predetermined intended reference number of pieces of the articles. The comparator 42 produces an output when both inputs coincide with each other, and the output is coupled to the other input of the AND gate 30.

It is self-evident from the above description that the combination memory 32 can produce a set of outputs for driving the corresponding loading and unloading devices of the balances only when the total weight of the articles on these balances falls within a predetermined allowable range and, at the same time, the total number of the same articles coincides with a predetermined number.

It should be noted that the above description has been made in conjunction with one embodiment and various changes and modifications can be made within the scope of this invention as defined in the appended claims. For example, the combination generator 16 need not be a binary counter but other more convenient configurations can be designed by those skilled in the art such that the combinations are made by m from n where m is an integer less than n, for example. While the comparator 42 has been shown to sense coincidence of both inputs, it may be designed to sense allowability with respect to a predetermined range as in the case of the comparators 20 and 22. Furthermore, while the dividers 34 and the register 36 were used for providing the total number of articles in each group of articles, mechanical, optical or electric direct counter means may be used for this purpose.

What is claimed is:

1. A combination weighing device, comprising a plurality of weighing balances for weighing a plurality of articles to produce electric signals indicative of the respective measured weights, a first adder circuit for summing up the incoming signals to produce a first sum signal, first normally-open switches having a control input each for coupling therethrough the weight signals from said weighing balances respectively to said adder circuit, means for comparing said first sum signal with a predetermined allowance of weight to produce a first command signal when the sum satisfies said allowance, switch control means for providing a predetermined set of combinations of control signals applied to the control inputs of said first switches respectively to close them in accordance with said combinations in turn, and means responsive to said first command signal for storing a current combination of said control signals for utilization, a plurality of detection units associated with said weighing balances respectively for detecting the number of articles on said balances to produce electric signals indicative of the respective detected numbers, a second adder circuit for summing up the incoming signals to produce a second sum signal, second normally-open switches having control inputs coupled respectively to the corresponding outputs of said switch control means for coupling therethrough the number signals from said detection units respectively to said second adder circuit, means for comparing said second sum signal with a predetermined allowable number to produce a second command signal when the sum satisfies said allowance, and means for causing said storing means to be responsive only to presence of both of said first and second command signals.

2. A combination weighing device, according to claim 1, characterized in that said number control unit includes a common register for storing a predetermined unit weight of said articles, and a divider circuit coupled to said register and corresponding one of said weighing balances for dividing the corresponding weight signal by said unit weight and then rounding the result into an integer to produce an output indicative of the number of articles.

* * * * *